United States Patent

[11] 3,527,204

| [72] | Inventors | Donald J. Lem<br>Peekskill;<br>Herbert D. Steinbeck, Chappaqua, New York |
|---|---|---|
| [21] | Appl. No. | 459,839 |
| [22] | Filed | May 28, 1965 |
| [45] | Patented | Sept. 8, 1970 |
| [73] | Assignee | International Business Machines Corporation<br>Armonk, New York<br>a corporation of New York |

[54] PRESSURE CUFF SYSTEM
12 Claims, 5 Drawing Figs.

[52] U.S. Cl. .......................................... 128/2.05
[51] Int. Cl. .......................................... A61b 5/02
[50] Field of Search .......................................... 128/2, 327, 2.05

[56] References Cited
UNITED STATES PATENTS

| 2,168,890 | 8/1939 | Weiss | 128/2.05 |
| 2,710,001 | 6/1955 | Freyburger | 128/2.05 |
| 2,714,379 | 8/1955 | Raines | 128/2.05 |
| 3,095,873 | 7/1963 | Edmunds, Jr. | 128/2.05 |
| 618,049 | 1/1899 | Barnard et al. | 128/2.05 |
| 2,272,836 | 2/1942 | Gerdien | 128/2.05 |
| 2,379,573 | 7/1945 | Gilson | 128/2.05 |
| 2,678,040 | 5/1954 | Poole et al. | 128/2.05 |
| 2,854,968 | 9/1958 | Wright | 128/2.05 |

FOREIGN PATENTS

| 726,777 | 3/1932 | France | 128/2.05 |

Primary Examiner—William E. Kamm
Attorney—Hanifin and Jancin

ABSTRACT: A pressure cuff system for automatically standardizing the volume of fluid applied to the cuff and the tension applied by the cuff to body extremities. A pressure cuff having first and second flat inflatable chambers juxtaposed are formed in an annulus loosely around an extremity by an undistensible envelope. Initial inflation of either chamber provides automatic adjustment of the cuff to the extremity. A fixed volume of fluid is automatically pumped into the first chamber adjacent the extremity and fluid is automatically pumped into the second outer chamber until a predetermined pressure is reached and a predetermined tension is applied to the extremity. Control means responsive to the predetermined pressure vent the first chamber fluid to atmosphere while transducer means sense systolic and diastolic pressure points.

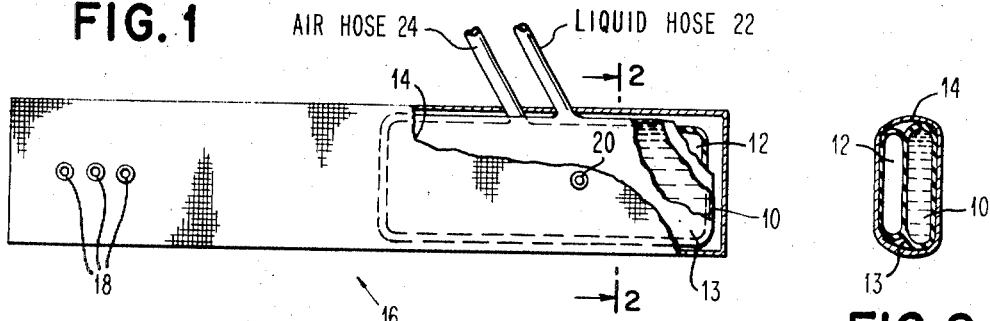
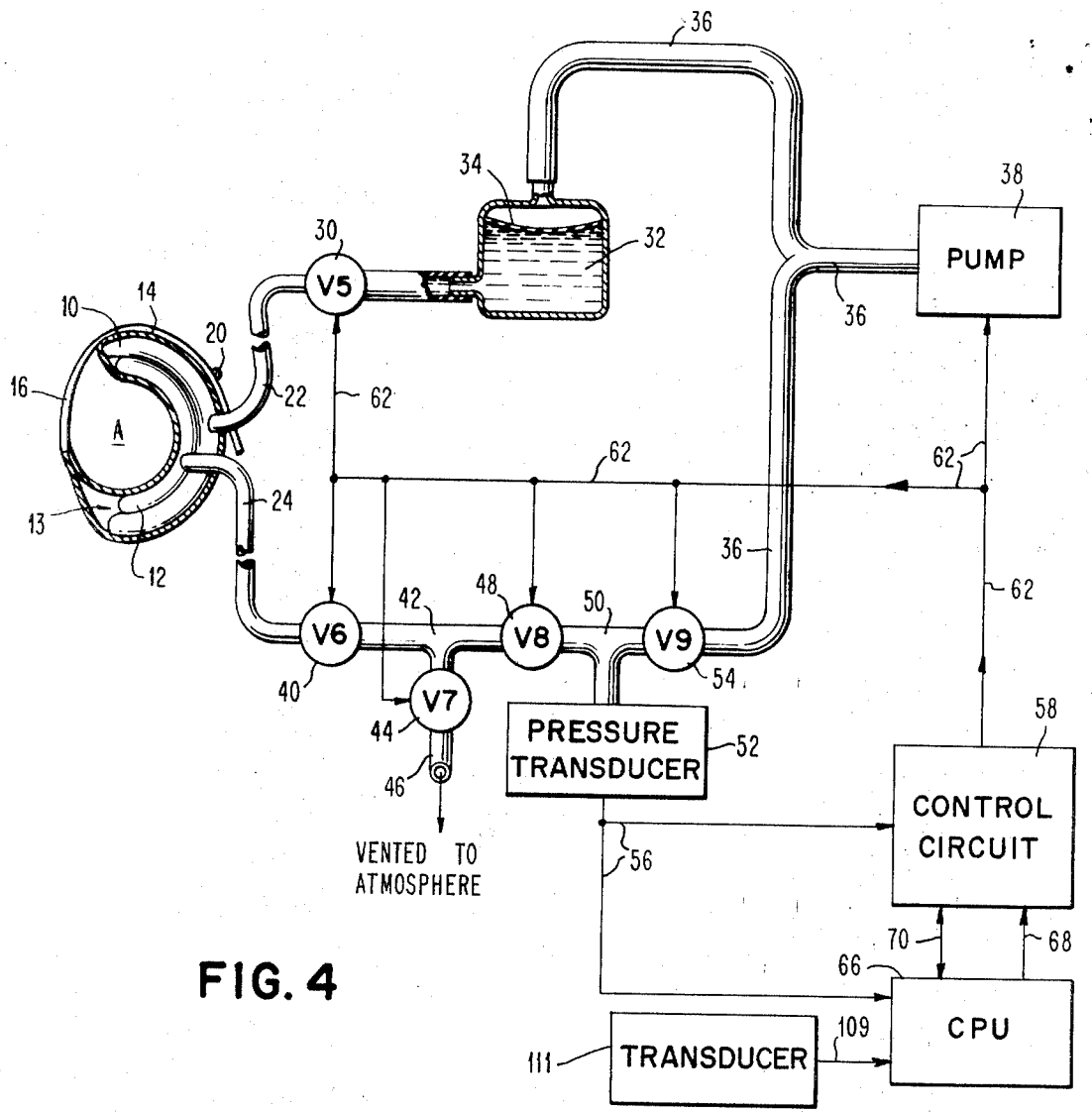

3,527,204

PRESSURE CUFF SYSTEM

This invention relates to a pressure cuff system and more particularly to a system for automatically standardizing the volume of fluid applied to the cuff and the tension applied by the cuff to body extremities during a determination of blood pressure, pulse rate, or similar body functions.

Blood pressure readings on human or animal subjects are ordinarily obtained by a physician, nurse, or other medically trained individual by use of a constricting or pressure cuff. With this indirect method of determining blood pressure factors such as variations in the cuff area, cuff tension, and volume of fluid applied to the cuff are known to introduce significant errors in the values obtained. It would therefore be desirable to standardize these factors so that variations in the readings obtained from a subject can uniformly be ascribed to changes in his physical condition rather than to idiosyncrasies of the individual administering the test or of the equipment. Therefore, where very accurate blood pressure readings are required, a cuff system which permits standardization of cuff tension and fluid volume is required.

There are also situations where manipulation of the equipment by medical personnel or the subject is inconvenient or impossible. Such situations may arise in standard medical environments such as hospital operating rooms and intensive care units and in certain unusual environments such as those encountered in space flight. In these situations, an automatic, indirect determination of blood pressure and pulse rate must be made. While at present, the automatic gathering of diagnostic information is limited to situations such as those described above, it is not inconceivable that, in the near future, a large part of the data required in giving a person a normal physical examination will be automatically accumulated by, for example, having the individual slip into a specially designed apparatus, thereby relieving busy physicians from these routine tests.

Schemes which have been suggested for the automatic taking of blood pressure readings generally require that the cuff initially be positioned on the subject's arm and that air then be pumped into the cuff either by the subject or under automatic control. When the cuff has been pumped to a desired pressure, air is permitted to escape from the cuff and the systolic and diastolic pressure readings obtained. These readings may be obtained using the oscillatory method by having a pressure transducer positioned to sense both the applied pressure and the oscillations in this pressure caused by pulsations transmitted from the blood arteries. The applied pressure at which large amplitude oscillations begin and end serve as a measure of the systolic and diastolic pressure respectively. Automatic blood pressure readings may also be taken using the auscultatory method with a microphone being substituted for the doctor's stethoscope. The beginning of the first sound is taken as an index of the systolic pressure and either the time at which the sound changes from phase three (a fairly loud tapping sound) to phase four (a muffled tapping) or the time at which the sound completely disappears is used as an index of the diastolic pressure. The change of color of a finger which occurs during each pulse may also be used in taking automatic blood pressure readings. Pulse rate readings may, of course, be taken much more easily by merely pumping the cuff to some pressure between the diastolic and the systolic pressure of the individual and recording the number of pulsations which occur during a given time interval.

The factors mentioned above (i.e., variations in cuff width, cuff tension, and volume of fluid applied to the cuff) as potential sources of error when manual pressure readings are being taken are even more serious sources of error when these readings are being taken automatically because, among other things, of the difficulty in making a proper adjustment of the cuff. These factors not only vary the pressure applied to the arterial supply of the extremity to which the cuff is applied, but also vary the response of the sensing device which is used in making the automatic pressure determinations. A cuff system which standardizes cuff tension and fluid volume applied to the cuff is therefore an essential element in obtaining accurate pressure readings, by use of automatic and indirect methods.

Errors may also be introduced in automatically taken blood pressure readings by changes in the position of the subject which may, for example cause him to rest on the cuff or by external forces such as changes in environmental pressure. Some means for compensating for these factors should be provided.

Still another problem encountered with automatic pressure determinations, particularly in situations where the subject's physical condition is being monitored over long periods of time, is that the cuff, even with all the air removed, is still fairly tight and therefore a source of some discomfort. It is therefore desirable that the cuff system employed be capable of achieving the desired cuff tension when pressure readings are being obtained and of permitting the cuff tension to be reduced to a point where it no longer causes any discomfort to the wearer during periods when no readings are being taken.

It is therefore a primary object of this invention to provide an improved pressure cuff system.

A more specific object of this invention is to provide a pressure cuff system the cuff tension and fluid volume of which may be standardized.

Another object of this invention is to provide a pressure cuff system of the type described above which may be automatically operated to provide indirect blood pressure and pulse rate readings.

Still another object of this invention is to provide a pressure cuff system which at least partially compensates for variations in the external forces applied to the cuff.

A further object of this invention is to provide a pressure cuff system, the cuff tension of which may be reduced to a point where it causes negligible discomfort to the wearer during time periods when no readings are being taken.

In accordance with these objects this invention provides a pressure cuff having a first and a second chamber with the second chamber being positioned to apply pressure to the first. A known volume of a fluid such as air is applied to one chamber and a sufficient volume of incompressible fluid such as water is applied to the other chamber to cause the total tension applied by the cuff to the extremity to which it is applied to equal some predetermined value. The first chamber is then vented to atmosphere allowing the air to escape and systolic and diastolic pressure readings are taken by for example, one of the automatic techniques indicated above.

The foregoing and other objects, features and advantages of the invention will be apparent from the following more particular description of preferred embodiments of the invention, as illustrated in the accompanying drawings.

In the drawings:

FIG. 1 is a back view of the pressure cuff of the preferred embodiment of the invention in an uncoiled condition;

FIG. 2 is a sectional view of the pressure cuff of the preferred embodiment of the invention taken along the lines 2—2 in FIG. 1;

FIG. 4 is a semi-block diagram of an alternative embodiment of the pressure cuff system of the invention also showing a cross section of the cuff in its coiled condition.

GENERAL DESCRIPTION OF THE CUFF

Figure 3:
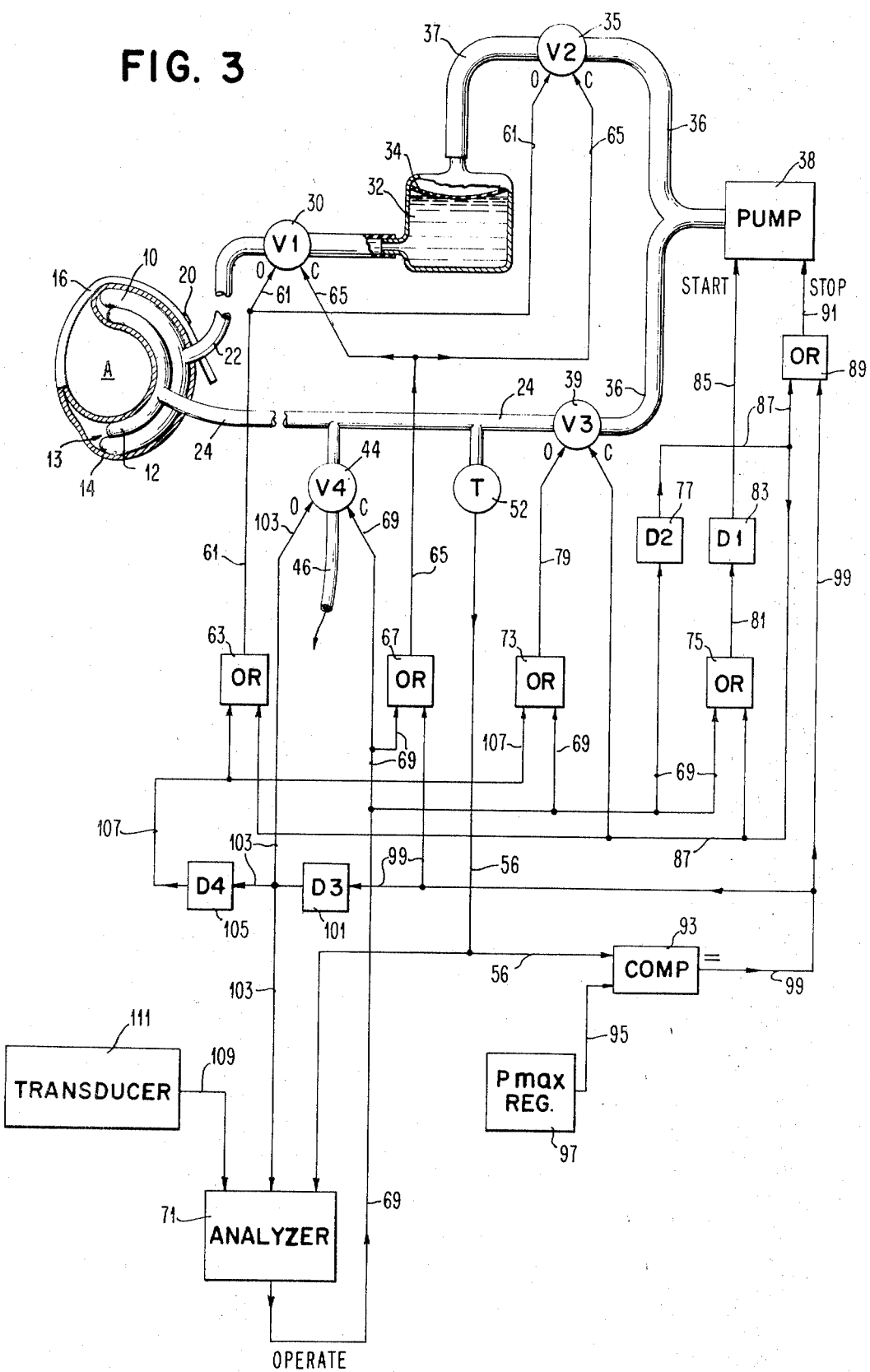
FIG. 3 is a semi-block diagram of a pressure cuff system embodiment of the invention showing a cross section of the cuff in its coiled condition.

Referring first to FIGS. 1 and 2 it is seen that the pressure cuff of the preferred embodiment of the invention consists of two adjacent chambers 10 and 12 formed in a flat bag 13 of rubber or other pliable material. Bag 13 is covered by an undistensible envelope 14 of cotton or similar fabric. Chamber 10 is at least as large as chamber 12 and is positioned above it. Fabric 14 extends beyond the end of bag 13 to form a flange 16 of roughly equal length to the bag itself. For best results the fabric should be at least 12 centimeters wide for adults (*i.e.* approximately 20 percent the diameter of the extremity to which the cuff is applies). The flange 16 has three metal button holes 18 positioned in it near its far end and a metal button 20 is attached to the fabric near the opposite end of the cuff. A length of flexible tubing 22 of rubber or similar material connects to chamber 10 and a length of flexible tubing 24 connects to chamber 12.

GENERAL DESCRIPTION OF FIG. 3

FIG. 3 shows a system in which the pressure cuff of this invention is employed. Referring to this figure it is seen that tube 22 is connected through an electrically controlled valve 30 to a reservoir 32 of an incompressible fluid, such as water. Pressure is applied to reservoir 32 by a diaphragm 34. Pressure is applied to the upper surface of diaphragm 34 by a pump 38 applying pressure through tube 36, electrically controlled valve 35, and tube 37. Pump 38 may be any standard device of this type which is capable of starting in response to one input, stopping in response to a second input, and pumping a known volume of air per unit time when running. Tube 24 from chamber 12 is connected to pump line 36 through electrically controlled valve 39 and to tube 46 through electrically controlled valve 44. Tube 46 is vented to atmosphere. Tube 24 is also connected as the input to pressure transducer 52. Pressure transducer 52 may be any standard device of this type which converts air pressure into an electrical output in digital or other form suitable to printed out or for input to a general or special purpose computer.

Valves 30, 35, 39 and 44, which valves will also be designated valves V1—V4, respectively, may be any electrically controlled valves, as for example, solenoid valves, which open in response to a signal applied to one input and close in response to a signal applied to the other input. The open input to valves 30 and 35 is output line 61 from OR gate 63. The inputs to this OR gate will be described later. The close input to valves 30 and 35 is output line 65 from OR gate 67. One input to OR gate 67 is operate line 69 from analyzer 71. Analyzer 71 may be a general purpose or special purpose computer or may merely be an input-output terminal. It is capable of accepting information to be described later from the system and of either analyzing this information or putting it in a form to be analyzed. The signal on operate line 69 may be generated either under computer control or in response to a manual input from a control terminal. The signal on operate line 69 is also applied to the close input of valve 44, as one input to OR gate 73, as one input to OR gate 75, and as the input to delay 77. Output line 79 from OR gate 73 is connected as the open input to valve 39 and output line 81 from OR gate 75 is connected as the input to delay 83. Output line 85 from delay 83 is connected to start pump 38. Output line 87 from delay 77 is connected as one input to OR gate 89, as one input to OR gate 63, as the second input to OR gate 75, and as the close input to valve 39. Output line 91 from OR gate 89 is connected as a stop input to pump 38. Delays 83 and 77 are also designated as delays D1 and D2 respectively. The duration of delay D2 is greater than the duration of delay D1 by the time required for pump 38 to pump the predetermined volume of gas which it is desired to apply to chamber 12.

Output line 56 from pressure transducer 52 is connected as one input to compare circuit 93 and as one of the inputs to analyzer 71. The other input to compare circuit 93 is output line 95 from P max register 97. The maximum pressure which it is desired to pump the pressure cuff up to is initially set into P max register 97 in a manner not shown. Equal output line 99 from compare circuit 93 is connected as the second input to OR gates 67 and 89 and the input to delay 101. Output line 103 from delay 101 is connected as the energize input to analyzer 71, as the open input to valve 44, and as the input to delay 105. Delays 101 and 105 are also referred to as delays D3 and D4, respectively. The duration of delay D3 is sufficient to permit the valves to be properly operated and the duration of delay D4 is sufficient to permit chamber 12 to be fully evacuated when valve 44 is open. Output line 107 from delay 105 is connected as the second input to OR gates 63 and 73.

The final input to analyzer 71 is output line 109 from transducer 111. Transducer 111 may be of a type to detect blood flow in the extremity to which the pressure cuff is applied or it may be a microphone which is placed under the cuff when blood pressure is measured using the auscultatory method.

OPERATION OF SYSTEM OF FIG. 3

The operation of the cuff system shown in FIG. 3 will first be described in a general manner with a more detailed description of its operation to follow. As a first step in the operation, the cuff is generally positioned on the extremity and transducer 111 is suitably positioned relative to the cuff. Analyzer 71 then applies a signal to line 69, either under computer or manual control which closes valves V1, V2, and V4 and opens valve V3. The signal on line 69 also starts pump 38 causing air to be applied to air chamber 12. After the pump has run for a sufficient period of time for a predetermined volume of air to have been applied to chamber 12, delay 77 generates an output signal which is applied to the stop pump 38.

The output from delay 77 is also applied to close valve V3 and to open valves V1 and V2. Pump 38 is then restarted causing air pressure to be applied to reservoir 32. The pressure build-up in reservoir 32 is transmitted through valve 30 to liquid chamber 10 causing the tension applied by the cuff to the extremity and also to the known volume of air in air chamber 12 to increase. When this pressure has increased to a desired value, compare circuit 93 generates an output signal on line 99 which is applied to stop pump 38 and to close valves 30 and 35. At this time a standardized pressure is being applied by the cuff and there is a standardized volume of air in chamber 12 of the cuff. The desired standardization of pressure and volume has therefore been attained. The standard pressure is a function of the total pressure applied to the cuff and any external forces acting on the cuff are therefore substantially compensated for.

Valve V4 is then opened, permitting the air in chamber 12 to be vented to atmosphere and the readings from pressure transducer 52 and transducer 111 are applied to analyzer 71. From these inputs, analyzer 71 determines the systolic and diastolic pressure of the subject. When all but a residual amount of air has been vented from chamber 12, delay 105 applies a signal to line 107 causing valves V1—V3 to be opened. This allows the pressure being applied by the liquid chamber 10 to be relieved, so that the cuff causes the wearer no appreciable discomfort until blood pressure readings are again desired.

Looking at the operation now in more detail, after the cuff is loosely positioned on the extremity which is being used for the measurement, and transducer 111 is positioned to receive the desired inputs, an input is applied to analyzer 71, either under computer or manual control to cause an output signal on line 69. This signal is applied to close valves V1, V2, and V4, to open valve V3, and to the input of delays 83 and 77. A signal appears on output line 85 from delay 83 a sufficient period of time after the original signal on line 69 to permit valves V1—V4 to be operated. This signal is applied to start pump 38. It is assumed that a more or less fixed quantity of air always remains in air chamber 12 after each operation of the cuff. Since this is often not true for the first cycle of operation of the cuff, readings taken during this cycle will generally be ignored.

Pump 38 being turned on causes air to flow through tube 36, opened valve 39, and tube 24 into air chamber 12. The difference in delays D1 and D2 is such that pump 38, which pumps a known volume of air per unit time, has applied a predetermined volume of air to chamber 12 when a signal appears on output line 87 from delay 77. The signal on line 87 is applied through OR gate 89 and line 91 to stop pump 38 and is also applied to close valve 39 and to one input of OR gates 63 and 75. Output line 61 from OR gate 63 is connected to open valves 30 and 35 and output line 81 from OR gate 75 is connected to the input of delay 83. When a sufficient period of time has passed to allow all the valves to be operated, delay D1 generates an output signal on line 85 which is applied to restart pump 38.

Since valve 35 is now opened and valve 39 is closed, air now flows through tube 36, valve 35 and tube 37 to apply pressure to the upper side of diaphragm 34. This pressure is transmitted through diaphragm 34 to reservoir 32 causing fluid to be transferred through valve 30 and tube 22 to fluid chamber 10. The increased amount of fluid in chamber 10 causes increased pressure to be applied to the fixed volume of air in chamber 12 and also to the extremity to which the cuff is applied. The pressure applied to the air chamber 12 is monitored by transducer 52. When this pressure becomes equal to a predetermined maximum pressure stored in register 97, compare circuit 93 generates an output signal on line 99 which is applied through OR gate 89 to line 91 to stop pump 38 and is also applied through OR gate 67 and line 65 to close valves V1 and V2. It is recognized that the valves V1 and V2 cannot be closed instantaneously and pump 38 cannot be stopped instantaneously so that the pressure applied to the system will in fact be slightly greater than P max. However, the value actually set in P max register 97 may be slightly less than desired to compensate for this overshoot.

The signal on output line 99 from compare circuit 93 is also applied to the input of delay 101. When a sufficient time period has elapsed for all of the valves to be operated, delay 101 generates an output signal on line 103 which is applied to inform analyzer 71 that readings should now be taken and to open valve 44 permitting the air in air chamber 12 to be vented to the atmosphere. Transducer 52 monitors the decreasing pressure in the chamber 12 and applies this information through line 56 to one input of analyzer 71. At the same time information relative to sound, color, or other factor which may permit a blood pressure determination to be made is applied to the analyzer through line 109 from transducer 111. Analyzer 71 may then either determine blood pressure readings from this information or convert the information into a form suitable for printout or input to some other form of computing device.

The signal on output line 103 from delay 101 is also applied to delay 105. When a sufficient period of time has elapsed for all but a residual amount of air in chamber 12 to have been vented to atmosphere, delay 105 generates an output signal on line 107 which is applied through OR gate 63 and line 61 to open valves V1 and V2 and through OR gate 73 and line 79 to open valve V3. This permits the air pressure which has built up above diaphragm 34 to be vented through tube 37, valve 35, tube 36, valve 39, tube 24, and valve 44 to atmosphere and permits fluid to return from liquid chamber 10 through tube 22 and valve 30 to reservoir 32 thereby relieving the pressure applied by the cuff. The cuff system is in this way reset in preparation of the next cycle of operation.

GENERAL DESCRIPTION OF SYSTEM OF FIG. 4

FIG. 4 shows another system in which the cuff shown in FIG. 1 is employed. This system is a little more complex than that shown in FIG. 3 but provides a somewhat greater degree of control. Where possible, like numbers have been used to designate like elements in all the figures.

Referring now to FIG. 4, it is seen that in this embodiment of the invention tube 22 is connected through electrically controlled valve 30 to reservoir 32 of an incompressible fluid, such as water. Pressure is applied to the fluid in reservoir 32 by diaphragm 34 as a result of air pressure applied to the upper surface of the diaphragm by air pump 38 through tube 36. It will be remembered that pump 38 is of a type which pumps a known volume of air during a given time period.

Tube 24 from chamber 12 is connected through valve 40 to tube 42. Tube 42 is connected through valve 44 to tube 46 and through valve 48 to tube 50. Tube 46 is vented to atmosphere. Tube 50 is connected to pressure transducer 52 and through valve 54 to beforementioned tube 36 leading to air pump 38. As before, pressure transducer 52 may be any standard device of this type which converts an air pressure into an electrical output in digital or other form suitable to be printed out or for input to a general or special-purpose computer. Valves 30, 40, 44, 48 and 54, which also will be designated valves V5—V9, respectively, may be any electrically controlled valve, as, for example solenoid valves, which open in response to one type of input and close in response to another type of input. The close input may, in fact, be the cessation of the open input.

Figure 5:
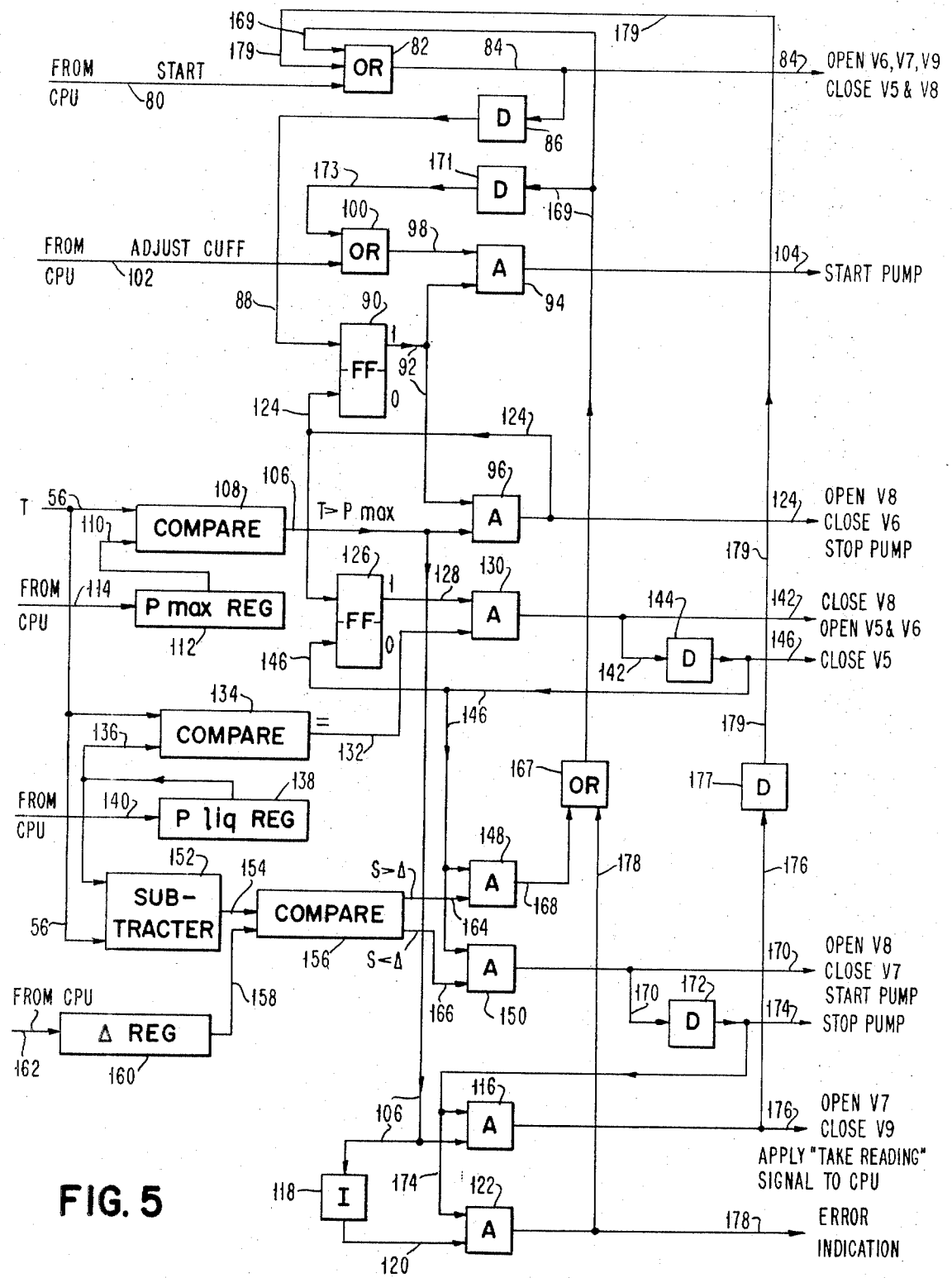
FIG. 5 is a block diagram of the control circuit shown in FIG. 4.

Output line 56 from pressure transducer 52 is connected as an information input to control circuit 58 and central processing unit (CPU) 66. A suitable control circuit 58 is shown in FIG. 5 and will be described later. Output lines 62 from control circuit 58 are connected to open and close valves V5—V9 and to start and stop air pump 38. CPU 66 may be a general-purpose computer or may be a special-purpose computer used, for example, to determine blood pressure readings. Data signals to be described later are applied to control circuit 58 through lines 68 and control signals are transferred between the CPU and control circuit 58 through lines 70. An additional input to CPU 66 is output line 109 from before-described transducer 111.

GENERAL DESCRIPTION OF OPERATION OF SYSTEM OF FIG. 4

In the following description, it will be assumed that it is blood pressure readings which are being taken. The subject whose pressure is being taken initially wraps the cuff around the upper portion of his arm just above the elbow and hooks one of the buttonholes 18 on button 20 so that the cuff fits loosely on his arm. With an individual such as an astronaut or a test pilot, the cuff would, in all likelihood, be initially attached in the proper position on his clothing or taped into position. When this operation is completed, the cuff appears as shown in FIG. 3 with the subject's arm being in opening A.

When no readings are being taken, valves V5, V7 and V9 are closed, and air pump 38 is turned off. Prior to the taking of any readings, certain valves, such as the maximum pressure which air pump 38 is to apply to the system, the liquid pressure which it is desired to apply to the system when the cuff is properly adjusted, and the acceptable tolerances on this liquid pressure are set into appropriate registers in control circuit 58. These valves are set into these registers through lines 68 from CPU 66.

When it is desired to take a reading, an adjust-cuff signal is applied by CPU 66 through line 70 to control circuit 58. This starts air pump 38, resulting in a pressure build-up in reservoir 32 which is recorded by pressure transducer 52. When this pressure reaches the indicated maximum, pump 38 is stopped by a signal on a line 62, valve V8 is opened, and valve V6 closed. This allows some of the pressure built up in the reservoir to leak off through valve V7 to atmosphere. When the pressure in the reservoir has been reduced to the desired liquid pressure, signals appear on lines 62 causing valve V8 to be closed and valves V5 and V6 to be opened. The reason for the above-described bleeding operation is that it is difficult to pump the system up to an exact pressure. It is easier to pump it up above the desired pressure and then bleed off the excess pressure slowly until the desired pressure is reached. The opening of valve V5 permits the liquid in reservoir 32 to be applied through tube 22 to chamber 10. The opening of valve V6 allows any air which is in chamber 12 to be forced out through valves V6 and V7 to atmosphere. Liquid pressure is in this manner applied to the cuff to provide the desired initial tightness.

After a period of time sufficient to allow the pressure between reservoir 32 and chamber 10 to equalize, valve V5 is closed and a determination made as to whether the water forced out of reservoir 32 has caused any change in the pressure therein. If the pressure is not equal to the desired liquid pressure±a predetermined tolerance factor, the circuit returns to the initial condition and repeats the steps starting with those initiated when an adjust-cuff signal was received.

If the pressure at this time is equal to the desired liquid pressure±a predetermined tolerance factor, the cuff is properly adjusted (*i.e.* a proper initial tightness exists) and air may be applied to chamber 12. This is accomplished by opening valve V8, closing valve V7, and starting pump 38. It has been indicated previously that pump 38 pumps a predetermined volume of air per unit time. When a sufficient period of time has passed for pump 38 to pump the volume of air which should be required to cause the pressure applied by the cuff to equal the desired maximum pressure, pump 38 is stopped.

A determination is then made as to whether the pressure in the cuff is equal to the desired maximum pressure. If it is, signals are applied to lines 62 causing valve V7 to be opened, and valve V9 to be closed, and a signal is applied through line 70 to the CPU to tell it to start taking readings from transducers 52 and 111. This permits the air in chamber 12 to be vented to atmosphere at a fairly uniform rate and permits the desired systolic and diastolic pressure readings to be recorded. If the pressure in the cuff when air pump 38 is turned off is not equal to the desired maximum pressure, an error indication is applied by control circuit 58 through line 70 to CPU 66 and the system returns to its initial condition and starts a new cycle of operation the same as when an adjust-cuff signal was first received. A second attempt is thus made to obtain an accurate reading. The CPU may stop the operation after receiving a predetermined number of consecutive error indications.

DETAILED DESCRIPTION OF CONTROL CIRCUIT

FIG. 5 is a schematic diagram of a circuit suitable for use as the control circuit 58 shown in FIG. 4. One input to the circuit of FIG. 5 is a start signal from CPU 66 (FIG. 4) which is applied to line 80. Line 80 is one input to OR gate 82. Output line 84 from OR gate 82 is connected to open valves V6, V7 and V9 (FIG. 4), to close valves V5 and V8, and as the input to delay 86. Output line 88 from delay 86 is connected as the 1-side input to flip-flop 90. Output line 92 from the 1-side of flip-flop 90 is connected as one input to AND gates 94 and 96. The other input to AND gate 94 is output line 98 from OR gate 100. One input to OR gate 100 is adjust-cuff line 102 from the CPU (FIG. 4). Output line 104 from AND gate 94 is connected to start air pump 38 (FIG. 4).

The other input to AND gate 96 is output line 106 from compare circuit 108. One input to compare circuit 108 is output line 56 from pressure transducer 52 (FIG. 4) and the other input to this compare circuit is output line 110 from P max register 112. The maximum pressure which is to be applied to the system by air pump 38 is stored in register 112 by signals applied to lines 114 from CPU 66 (FIG. 4). A signal appears on line 106 as soon as the pressure applied to line 56 is greater than the P max pressure appearing on line 110. Line 106 is also connected as one input to AND gate 116 and through inverter 118 and line 120 as one input to AND gate 122. Output line 124 from AND gate 96 is connected to the 0-side input of flip-flop 90, to the 1-side input of flip-flop 126, and to open valve V8, close valve V6, and stop pump 38.

Output line 128 from the 1-side of flip-flop 126 is connected as one input to AND gate 130. The other input to AND gate 130 equals output line 132 from compare circuit 134. One input to compare circuit 134 is output line 56 from pressure transducer 52 (FIG. 4) and the other input to this compare circuit is output line 136 from P liq register 138. The desired liquid pressure which is to be applied to chamber 10 is stored in register 138 by signals applied to lines 140 from CPU 66 (FIG. 4). Output line 142 from AND gate 130 is connected to close valve V8, to open valves V5 and V6, and as the input to delay 144. Output line 146 from delay 144 is connected to close valve V5, to the 0-side input of flip-flop 126, and as one input to AND gates 148 and 150.

Lines 56 and 136 are also connected as the two inputs to subtracter 152. Output line 154 from subtracter 152 is connected as one input to compare circuit 156, the other input to this compare circuit being output line 158 from Δ register 160. The permissible tolerances on the liquid pressure applied to chamber 10 is stored in Δ register 160 by signals applied to lines 162 from CPU 66 (FIG. 4). A signal appears on output line 164 from comparator 156 when the results of the subtraction in subtracter 152 are greater than the tolerance stored in register 160 and a signal appears on output line 166 from compare circuit 156 when the output from the subtracter is less than the permissible tolerance. Lines 164 and 166 are connected as the second inputs to AND gates 148 and 150 respectively. Output line 168 from AND gate 148 is connected through OR gate 167 and line 169 as a second input to OR gate 82. Line 169 is also connected through delay 171 and line 173 as a second input to OR gate 100.

Output line 170 from AND gate 150 is connected to open valve V8 (FIG. 4), close valve V7, start pump 38, and as an input to delay 172. Output line 174 from delay 172 is connected to stop pump 38 and as the second input to AND gates 116 and 122. Output line 176 from AND gate 116 is connected to open valve V7, close valve V9, apply a "take readings" signal to CPU 66, and as the input to delay 177. Output line 179 from delay 177 is connected as a third input to OR gate 82. Output line 178 from AND gate 122 is connected to apply an error indication to CPU 66 and as a second input to OR gate 167.

DETAILED DESCRIPTION OF OPERATION OF EMBODIMENT OF FIG. 4

As a preliminary step to the operation of the system, signals are applied by CPU 66 (FIG. 4) through line 68 to lines 114, (FIG. 5) 140, and 162 to cause a P max value, P liq value, and Δ value respectively to be sent into the appropriate storage registers. A start signal is also applied by the CPU through line 70 to line 80 (FIG. 5) and OR gate 82 to line 84 to cause valves V5, V7 and V9 to be opened, valves V5 and V8 to be closed and to set flip-flop 90 to its 1-state. If the cuff is not already coiled about the subject's arm as a part of his clothing, etc., the subject coils the cuff about his arm and loosely adjusts it by fitting metal button 20 (FIG. 1) into one of the metal buttonholes 18.

CPU 66 then applies a signal through line 70, line 102 (FIG. 5), OR gate 100, and line 98 to one input of AND gate 94. Since flip-flop 90 was previously set to its 1-state, there is a signal on line 92 at this time, fully conditioning AND gate 94 to generate an output signal on line 104 which is applied to start pump 38. Since valves V5 and V8 are closed, there is a pressure build-up in tube 36 and reservoir 32 and, since valve V9 is opened, there is a like pressure build-up in tube 50 which is applied to pressure transducer 52. The pressure being monitored by pressure transducer 52 is applied through line 56 to one input of compare circuit 108 (FIG. 5). When this pressure becomes greater than the P max pressure stored in register 112, an output signal appears on line 106 from compare circuit 108 which signal is applied as one input to AND gate 96. The other input to this AND gate is beforementioned output line 92 from the 1-side of flip-flop 90. AND gate 96 is therefore fully conditioned to generate an output signal on line 124 which is applied to open valve V8, close valve V6, and stop air pump 38. The signal on line 124 is also applied to reset flip-flop 90 to its 0-state and to set flip-flop 126 to its 1-state.

Valve V6 being closed and valves V7, V8, and V9 being opened, permit the air pressure built up in tube 36 and therefore in reservoir 32 to leak off through tube 46 to atmosphere. Assuming a minimal pressure gradient between reservoir 32 and tube 50, the pressure in the system at this time may be monitored by pressure transducer 52. This pressure is applied as one input to compare circuit 134 (FIG. 5). The other input to this compare circuit is the desired liquid pressure which is to be applied to chamber 10, which pressure is stored in register 138. When the pressure in the system has dropped to the desired liquid pressure, compare circuit 134 generates an output signal on line 132 which is applied as one input to AND gate 130. The other input to this AND gate is the output signal on line 128 from the 1-side of flip-flop 126. AND gate 130 is therefore fully conditioned at this time to generate an output signal on line 142 which is applied to close valve V8 and to open valves V5 and V6. This permits the liquid pressure in reservoir 32 to be applied to chamber 10 and permits any residual air which might be in chamber 12 to be forced out through valves V6 and V7 to atmosphere. The desired initial cuff tightness is in this manner secured.

After a sufficient time period has passed for the pressure in reservoir 32 and chamber 10 to equalize, delay 144 generates an output signal on line 146 which is applied to close valve V5, to reset flip-flop 126 to its 0-state, and to condition AND gates 148 and 150. At this time, the liquid pressure in the system is being applied to one input of subtracter 152 and the desired liquid pressure is being applied to the other input of the subtracter. The output from subtracter 152, which represents the difference between the actual and desired liquid pressure, is applied as one input to comparator 156. It is recognized that the flow of liquid between reservoir 132 and chamber 10 may cause a change in the system pressure. The test in comparator 156 assures that this change does not exceed predetermined tolerances. If the difference between the actual and desired pressure exceeds the predetermined tolerance applied to comparator 156 from register 160, AND gate 148 is fully conditioned at this time to generate an output signal on line 168 which is applied through OR gate 167 and line 169 to OR gate 82 to cause valves V6, V7 and V9 to be opened, valves V5 and V8 to be closed, and flip-flop 90 to be set to its 1-state. The signal on line 169 is also applied through delay 171 and line 173 to OR gate 100 to initiate a new adjust-cuff operation.

If, on the other hand, the liquid pressure in chamber 10 is within the required tolerances at this time, AND gate 150 is fully conditioned to generate an output signal on line 170 which is applied to open valve V8, close valve V7, and start pump 38. Valves V5 and V7 being closed and valves V6, V8 and V9 being opened, permit air from pump 38 to be applied to chamber 12. Since pump 38 applies air to tube 36 at a uniform volume per unit time, a known volume of air has been applied to the chamber 12 when, a short period of time later, delay 172 applies a signal to line 174 to stop pump 38. The volume of air applied to chamber 12 during this time should cause the pressure therein to just exceed P max. If it does, compare circuit 108 is generating an output signal on line 106 at this time, fully conditioning AND gate 116 to generate an output signal on line 176 which is applied to open valve V7, close valve V9, and apply a "take readings" signal to CPU 66. The opening of valve V7 and closing of valve V9 permits the air in the chamber 12 to be vented to atmosphere at a fairly uniform rate, resulting in a fairly uniform decrease in the pressure recorded by transducer 52. This information, in conjunction with the information applied to CPU 66 by transducer 111 is used by the CPU to generate systolic and diastolic blood pressure readings. When the readings have been taken, delay 177 generates an output signal on line 179 which is applied through OR gate 82 to set valves V5—V9 and flip-flop 90 for the next adjust cuff operation.

If, on the other hand, due to some malfunction in the system, the pressure in the chamber 12 at the time that air pump 38 is stopped is not greater than P max, AND gate 122 is fully conditioned to generate an output signal on line 178 which is applied through line 70 (FIG. 4) to CPU 66 to give an error indication. The signal on line 178 is also applied through OR gate 167 to line 169 to initiate a new operating cycle of the system. In this way, a second attempt is made to properly adjust and operate the pressure cuff system. After the CPU has received a predetermined number of error indications, it may terminate the operation.

While in the above discussion, the pressure cuff system has been operated to take blood pressure readings, it is apparent that either of the systems described above could be similarly operated to take pulse rate readings. To accomplish this, with the embodiment of the invention shown in FIG. 3, the fixed volume of air would be pumped into chamber 12 and liquid would then be forced into chamber 10 until the total pressure applied by the cuff was somewhere between the systolic and diastolic pressure of the individual. Similarly, with the system of FIG. 4, liquid would be applied to chamber 10 in the same manner as that described above to cause a proper initial adjustment of the cuff and air pressure would then be applied to chamber 12 until the total pressure applied by the cuff was somewhere between the systolic and diastolic pressure of the individual. With either system, the cuff would then be maintained at this pressure for a sufficient period of time for either pressure transducer 52 or some other similar transducer in conjunction with timer equipment (not shown) to record the pulse rate.

While it has been suggested that water be used as the incompressible fluid applied to chamber 10, it is apparent that any incompressible fluid could be used for this purpose. Likewise, while it has been suggested that air be used as the fluid applied to chamber 12, it is apparent that other gases could be used for this purpose. A liquid such as water might also be used to fill chamber 12. However, the density of such a fluid would tend to damp and thereby distort some of the pulsations which are necessary in taking the readings, and the greater mass of a liquid would be an added disadvantage to such an arrangement. It should also be pointed out that while chamber 12 has been shown as overlaying chamber 10, the cuff could also be constructed with the bag of chamber 10 inside that of chamber 12.

While the invention has been particularly shown and described with reference to preferred embodiments thereof, it will be understood by those skilled in the art that the foregoing and other changes in form and details may be made therein without departing from the spirit and scope of the invention.

We claim:

1. In an arterial pressure determination system:
 a self-adjusting pressure cuff including an inflatable chamber means for applying pressure to a body extremity, said inflatable chamber means when uninflated causing said cuff to be sufficiently loose so that an inappreciable pressure is applied to said body extremity;
 means coupled to said chamber means for inflating said chamber means with a predetermined quantity of fluid to apply a first increment of pressure to said extremity to thereby initially adjust said cuff to said extremity with said predetermined quantity of fluid; and
 means for applying a second increment of pressure to said chamber, said second increment being sufficient to create a total pressure on said extremity sufficient to overcome arterial pressure.

2. A self-adjusting pressure cuff system producing the same cuff tension using the same quantity of gas each cycle of operation comprising:
 a pressure cuff including an inflatable chamber means for creating cuff tension when inflated and applied to a body extremity, said inflatable chamber means when uninflated causing said cuff to be sufficiently loose so that an inappreciable pressure is applied to said body extremity;
 means supplying said chamber the same quantity of gas each cycle of operation to thereby initially adjust said cuff to snugly fit said extremity with the same quantity of gas each cycle of operation; and
 means automatically adjusting said cuff to cause said same quantity of gas to create the same cuff tension each cycle of operation.

3. A self-adjusting pressure cuff system producing the same cuff tension using the same quantity of gas each cycle of operation comprising:
 a pressure cuff including an inflatable chamber means for creating cuff tension when inflated and applied to a body extremity, said inflatable chamber means when uninflated causing said cuff to be sufficiently loose so that an inappreciable pressure is applied to said body extremity;
a fluid supply;

means supplying a fixed volume of fluid to said chamber means from said fluid supply each cycle of operation to thereby initially adjust said cuff to said extremity with said fixed volume of fluid each cycle of operation; and adjusting means acting in cooperation with said inflatable chamber means to cause said fixed volume of fluid to produce a predetermined cuff tension each cycle of operation thereby causing said chamber means to be protected from changes in external pressure affecting conditions so as to reduce variations in said tension over successive cycles of operation.

4. A cuff system of the type described in claim 3 with means operative in response to said predetermined tension to vent said fixed volume of fluid.

5. A pressure cuff system, including a cuff having a first inflatable chamber and an undistensible covering, said first inflatable chamber positioned on the inner wall of said undistensible covering to be formed in an annulus around a body extremity, the improvement comprising:

a second inflatable chamber interposed between at least a portion of said first chamber and said undistensible covering, said first and second chambers when uninflated causing said cuff to be sufficiently loose so that an inappreciable pressure is applied to said body extremity;

means for supplying fluid to said second chamber to adjust said cuff to said body extremity and impart a predetermined pressure to said first inflatable chamber and said body extremity; and means thereafter supplying a fixed volume of fluid to said first chamber causing said second chamber to apply additional pressure to said first chamber to create a total predetermined pressure on said body extremity.

6. A system of the type described in claim 5 wherein the fluid supplied to said second chamber is incompressible.

7. A system of the type described in claim 5 wherein the fluid supplied to said first and second chambers is under pressure.

8. A system of the type described in claim 5 wherein the fluid supplied to said second chamber is incompressible and the fluid supplied to said first chamber is a gas.

9. A system of the type described in claim 8 wherein said gas is air.

10. A self-adjusting pressure cuff system producing a fixed predetermined tension when applied to a body extremity comprising:

a cuff having a first inflatable chamber and an undistensible covering, said first inflatable chamber positioned on the inner wall of said undistensible covering to be formed in an annulus around said body extremity;

a second inflatable chamber interposed between at least a portion of said first chamber and said undistensible covering, said first and second chambers when uninflated causing said cuff to be sufficiently loose so as to apply an inappreciable pressure to said body extremity;

means to inflate said first chamber with a predetermined fixed volume of fluid to adjust said cuff to said body extremity and create a partial tension in said cuff to apply pressure to said body extremity; and means to inflate said second chamber with a quantity of incompressible fluid to add tension to said partial tension sufficient to cause the total tension in said cuff to equal said fixed predetermined tension.

11. A pressure cuff system of the type described in claim 10 wherein said fluid inflating said first chamber is air and the incompressible fluid inflating said second chamber is water.

12. A pressure cuff system for obtaining blood pressure readings from a body extremity comprising:

a pressure cuff including, within, a first inflatable chamber means for creating pressure on said body extremity, said first chamber means when uninflated causing said cuff to be sufficiently loose so as to apply an inappreciable pressure to said body extremity;

means supplying said first chamber means a predetermined volume of fluid, said means supplying including pump means providing a constant volume of fluid to said first chamber means per unit of time and timing control means for terminating said fluid flow to said first chamber means at the end of a predetermined time, said fluid acting to adjust said cuff and apply a partial pressure to said body extremity;

automatic adjusting means including a second inflatable chamber means within said cuff responsive to the termination of said fluid in said first chamber means to cause said pump means to provide fluid to said second inflatable chamber means so that the said first chamber means having said predetermined volume of fluid creates a predetermined total pressure sufficient to overcome the arterial pressure and terminate blood flow in said body extremity;

monitoring means responsive to said fluid within said first chamber means to continuously provide an electrical indication of the magnitude of the pressure of said fluid therein;

means operative in response to said monitoring means to provide slow venting of said predetermined volume of fluid when said predetermined pressure has been reached so as to slowly allow resumption of said blood flow;

transducer means responsive to the slow resumption of blood flow, by venting said fluid, to generate electrical signal indications of the systolic and diastolic pressure points; and means responsive to both the monitoring means and said electrical signal indications to determine the pressure at the systolic and diastolic pressure points.